United States Patent Office 3,042,584
Patented July 3, 1962

3,042,584
TREATMENT AND USE OF ENZYMES FOR THE HYDROLYSIS OF STARCH
Earl R. Kooi, La Grange, Clarence F. Harjes, Hinsdale, and John S. Gilkison, Chicago, Ill., assignors to Corn Products Company, New York, N.Y., a corporation of Delaware
No Drawing. Filed Dec. 22, 1960, Ser. No. 77,531
2 Claims. (Cl. 195—31)

This invention relates to a method for treating starch-hydrolyzing enzyme preparations and to an improved process for the production of hydrolyzates of starch containing an exceptionally high concentration of dextrose by means of such enzyme preparations.

Fungal amylase preparations, particularly those derived from members of the Aspergillus genus and the Rhizopus genus, are known to convert starchy materials to substantial amounts of dextrose. However, experience has shown that except in very dilute solutions, the conversion stops far short of complete conversion of the starch to dextrose.

Amylase preparations of microbiological origin, particularly those derived from the members of the Aspergillus genus and the Rhizopus genus, contain three major types of enzyme activity concerned with the hydrolysis of alpha-1,4-linked glucose polymers. These three types of activity may be classified as alpha-amylase activity, glucamylase activity, and transglucosidase activity.

Alpha-amylase action on starch pastes causes considerable reduction in viscosity. In the absence of appreciable amounts of glucamylase (or maltase) activity, considerable amounts of maltose are produced by alpha-amylase action.

Glucamylase activity on starch, partially hydrolyzed starch, or on maltose results in the formation of dextrose. This type of action has also been referred to as maltase activity, amyloglucosidase activity, glucogenic activity, or starch-glucogenase activity.

Transglucosidase activity results in the formation, particularly from maltose, of unfermentable dextrose polymers containing alpha-1,6-glucosidic linkages. Pan et al. (Arch. Biochem. Biophys., 42, 421–434 (1953)) tested the transglucosidase activity of various laboratory and industrial enzyme preparations and found that fungal amylase preparations exhibited considerable transglucosidase action. Pazur and French (J. Biol. Chem., 196, 265–272 (1952)) showed that the most probable action of the transglucosidase was to transfer a glucosyl radical from maltose to the 6-position of a glucose molecule, or to the 6-position of the non-reducing end of a maltose molecule, resulting in the formation of isomaltose, (6-($\alpha$-D-glucopyranosyl)-D-glucose) and panose, (4-(6-($\alpha$-D-glucopyranosyl) - (alpha-D-glucopyranosyl)-D-glucose), respectively.

We have now discovered that the transglucosidase content of fungal enzyme preparations is a considerable factor in limiting the extent to which amylaceous materials can be converted to dextrose by the enzyme preparation. When amylaceous materials in a reasonably concentrated solution are hydrolyzed by fungal enzyme preparations, the enzymatic resynthesis of carbohydrates which are not hydrolyzed to dextrose at an appreciable rate by the enzymes present in the enzyme preparation reduces the extent to which the amylaceous material can be converted to dextrose.

In prior art processes of obtaining crystalline dextrose from amylaceous materials, the yield of pure dextrose obtainable by successive evaporations and crystallizations of dextrose-containing liquors, resulting from either the enzyme or acid hydrolysis of starch is limited by the buildup of impurities in the mother liquors. In acid-converted liquors, these consist essentially of reversion products and ash. In liquors converted by means of amylase preparations, the impurities include the synthetic dextrose polymers resulting from the action of transglucosidase and the incompletely hydrolzed starchy materials.

An object of this invention is to remove transglucosidase activity from amylase preparations in order to increase the efficiency and usefulness of such preparations. A further object is to provide an improved process for the hydrolysis of starch or conversion products thereof to dextrose-containing liquors having an exceptionally high concentration of dextrose by means of such improved amylase preparations. Other objects will appear hereinafter.

All of the fungal amylase preparations examined by us contained appreciable amounts of transglucosidase activity, as measured by the extent of synthesis of unfermentable sugars from maltose. We have found further that the ratio of transglucosidase:glucamylase in the enzyme preparation, measured as described below, greatly affects the amount of dextrose that can be obtained from amylaceous materials upon hydrolysis with enzyme preparation.

*Determination of glucamylase activity.*—The substrate is a 15–18 D.E. spray-dried acid hydrolyzate of corn starch. This material is dissolved in water and diluted to 4.0 grams of dry substance per 100 ml. of solution. Exactly 50 ml. of the solution is pipetted into a 100-ml. volumetric flask. To the flask is added 5.0 ml. of pH 4.3, 1.0 molar sodium acetate-acetic acid buffer. The flask is placed in a water bath at 60° C., and after 10 minutes, the proper amount of enzyme preparation is added. At exactly 120 minutes after addition of the enzyme preparation, the solution is adjusted to a phenolphthalein end point with one normal sodium hydroxide. The solution is then cooled to room temperature, and diluted to volume. A reducing sugar value, calculated as dextrose, is determined on the diluted sample and on a control with no enzyme preparation added. Glucamylase activity is calculated as follows:

$$A = \frac{S-B}{2 \times E}$$

where:

$A$ = glucamylase activity, units per ml. or per gram of enzyme preparation.
$S$ = reducing sugars in enzyme converted sample, grams per 100 ml.
$B$ = reducing sugars in control, grams per 100 ml.
$E$ = amount of enzyme preparation used, ml. or grams.

The reducing sugar concentration in the enzyme-converted sample should be not more than 1.0 gram per 100 ml.

*Determination of Transglucosidase Activity.*—A solution of maltose is prepared by dissolving 200 grams of Pfanstiehl C.P. maltose in water and diluting to 500 ml. Exactly 50 ml. is pipetted into a 100-ml. volumetric flask. To the flask is added 5.0 ml. of pH 4.3, 1.0 molar sodium acetate-acetic acid buffer. After mixing, an amount of enzyme preparation containing 2.8 units of glucamylase activity is added. The flask is placed in a 60° C. water bath. After 72 hours, the flask is placed in a boiling water bath for 15 minutes, then cooled, and the contents are transferred quantitatively to a 150-ml. beaker. The solution is adjusted to pH 4.8 with two normal sodium hydroxide solution, transferred to a 500-ml. Erlenmeyer flask, and diluted to about 200 ml. Ten grams of Fleischmann's active dry yeast is added, and the flask is shaken continuously for 5 hours at 30° C. The contents are then transferred to a 250-ml. volumetric flask and diluted to volume. Two-hundred ml. are then centrifuged at 2000 r.p.m. for 15 minutes, and the supernatant liquor is decanted into a dry flask. Fifty ml. of this liquor is pipetted into a 70-ml. test tube, 5 ml. of 5.0 normal hydrochloric acid is added, the test tube is stoppered loosely, and is heated in a boiling water bath for 3 hours, then cooled in an ice bath. The contents of the tube are transferred to a 100-ml. volumetric flask, and adjusted with two normal sodium hydroxide to a phenolphthalein end point. A reducing sugar value, calculated as dextrose, is determined on an aliquot of the final solution. To obtain a correction for reducing sugar contributed by the yeast, a control sample is included in which 20 grams of pure dextrose are used in the place of maltose, no enzyme being added. The reducing sugar value of the enzyme-converted sample, corrected for reducing sugars contributed by the yeast, represents the unfermentable material synthesized by the enzyme preparation. Results are calculated as grams of unfermentable sugars synthesized per 100 grams of maltose hydrate added.

Since the two enzymes, glucamylase and transglucosidase, compete for the same substrate (maltose), the above results may be expressed as the ratio of transglucosidase activity to glucamylase activity. This ratio is obtained by dividing the grams of unfermentable sugars synthesized per 100 grams of maltose hydrate by 100 minus this value.

We have found that in the enzymatic conversion of amylaceous materials under practical conditions, the amount of dextrose finally formed is governed by this ratio of transglucosidase activity to glucamylase activity. We have found further that all fungal enzyme preparations examined by us exhibit transglucosidase: glucamylase ratios in the range of approximately 0.2-0.1. These fungal enzyme preparations, used under practical conditions of substrate concentration, amount of enzyme, and time of conversion, convert partial hydrolyzates of starch to hydrolyzates containing in the range of 84 to 90 percent dextrose, based on the dry substance content of the hydrolyzate.

The disadvantages of processes proposed in the prior art for the production of dextrose involving enzymatic hydrolysis of starchy materials are many fold. In order to obtain a high extent of conversion of the starchy materials to dextrose, such dilute concentrations of the starchy materials were used that the cost of evaporation rendered such processes uneconomicals. Other processes made use of highly purified enzyme preparations, still without attaining the improvements described herein.

We have made the startling discovery that we can remove transglucosidase activity substantially completely from fungal amylase preparations, thus remarkably lowering the transglucosidase:glucamylase ratio, by treating the amylase preparation with a clay mineral. We have also discovered that amylase preparations treated in this manner produce unexpectedly high yields of dextrose when used to hydrolyze starchy materials under practical conditions. Enzyme preparations which will convert partial hydrolyzates of starch to hydrolyzates containing only 85 to 86 percent dextrose, dry basis, will after treatment with a clay mineral, thereupon convert partial hydrolyzates of starch to hydrolyzates containing as much as 93 to 94 percent dextrose, dry basis.

The significance of this improvement is apparent when it is recognized that the yield of pure crystalline dextrose obtainable from hydrolyzates of starchy materials is, in general, governed by the amount of non-dextrose material present in the hydrolyzates. Each part of non-dextrose impurity in the hydrolyzate will prevent the recovery of approximately an equal weight of dextrose. For example, the yield of pure crystalline dextrose, expressed on an anhydrous basis, which can be economically obtained by crystallization from hydrolyzates of various dextrose contents has been found to be as follows:

| Dextrose content of hydrolyzate, percent dry basis | 86 | 88 | 90 | 92 | 94 |
|---|---|---|---|---|---|
| Recoverable dextrose, anhydrous basis, percent of hydrolyzate dry substance | 72 | 76 | 80 | 84 | 88 |

For each percent increase in the dextrose content of the hydrolyzate, a 2 percent increase in dextrose yield is obtained. The significance of the increased dextrose content of the enzyme hydrolyzate is apparent.

The practice of treating enzyme preparations or attempting to separate enzymes by the use of clay minerals is not new. However, none of the prior art practices has been directed toward solving our problem nor to our method of solving it. The prior art practice relating to the use of clay minerals in the treatment of fungal enzyme preparations has been directed toward the removal of extraneous protein, toward the separation of protease from alpha-amylase, or consists of strictly experimental attempts to isolate pure, single enzymes. None of the prior art has been directed toward the removal of transglucosidase from amylase preparations by the use of clay minerals, nor does the prior art contain evidence that transglucosidase can be removed from amylase preparations by treatment with a clay mineral. None of the prior art has been directed toward removal of transglucosidase from enzyme preparations as a means of increasing the yield of dextrose obtained upon use of the enzyme preparation in the hydrolysis of amylaceous materials. In any event, we are aware of no prior instance where transglucosidase activity has been removed substantially quantitatively from enzyme preparations without substantial loss of the desirable enzyme activity, such as glucamylase and alpha-amylase activity.

In carrying out the invention, the enzyme preparation is first treated by adding a clay mineral to a solution or suspension of the enzyme preparation. The enzyme preparation may consist of the whole culture liquor obtained from submerged growth of an amylase-producing microorganism; the clarified liquor obtained from the submerged culture, a suspension of a dried or partially dried preparation which may contain bran, starch, or various other adulterants used in standardizing the amylase preparation, or a solution of a completely soluble enzyme preparation. Following addition of the clay mineral to the solution or suspension of the enzyme preparation, the mixture is agitated and then the solid and liquid phases are separated. The transglucosidase activity is retained in the solid phase while the desirable carbohydrases, including, for example glucamylase and alpha-amylase, remain in the liquid phase.

Other methods may be used for bringing about contact of the clay mineral with the liquid enzyme preparation, provided that intimate contact between the clay mineral and liquid enzyme preparation occurs, and that the clay mineral is then separated from the liquid phase containing the desirable enzymes.

The resulting liquid enzyme preparation in which the activity of the desired glucamylase and alpha amylase is retained may then be used directly for the hydrolysis of starchy materials, or may be processed in known manner to obtain a solid enzyme preparation.

In general, any clay mineral may be used for the removal of transglucosidase activity. The clay minerals, as a group, are described as "silicates of alumina." The principal clay minerals are classified as montmorillonite, attapulgite, kaolinite, and illite. The clay minerals are "essentially hydrous aluminum silicates, with magnesium or iron proxying wholly or in part for the aluminum in some minerals, with alkalies or alkaline earths present as essential constituents in some of them." Some are further described as fuller's earth, floridin, sub-bentonite, china clay, and ball clay. They may range in composition from nearly pure magnesium silicate to aluminum silicate, and may also be synthesized from the component oxides or salts, or by reaction of crystalline minerals with chemical reagents. For details see data sheet No. 204, American Colloid Company (1945); Industrial Minerals and Rocks, Amer. Inst. Mining and Met. Eng. (1949 ed.), and Clay Minerology (R. E. Grim, McGraw Hill (1953) pages 18, 19).

The benefits of transglucosidase removal are obtained when the clay-treated enzyme preparation is used to convert amylaceous materials to dextrose. The treated enzyme preparation will convert the amylaceous materials to a higher dextrose yield than will the untreated enzyme preparation. The amylaceous material may range from gelatinized starch, partial acid hydrolyzates of starch, partial enzyme hydrolyzates of starch, to pure maltose.

While the final dextrose content attainable with a given enzyme preparation will depend somewhat on the specific substrate material, the benefits of transglucosidase removal will be apparent on all of the above mentioned substrate materials.

In the case of fungal amylase preparations, conversion of the amylaceous material should be carried out under conditions of pH, temperature, enzyme dosage, and time of conversion conducive to the formation of the maximum amount of dextrose by the enzyme preparation used. In the pH range of 3.5 to 5.5, at temperatures of 50°–70° C., it will be found that maximal dextrose yields will be obtained in about 72 hours if the glucamylase dosage is about 14 units per 100 grams of substrate dry substance. It will be apparent to those skilled in the art that lesser enzyme dosages may be used for longer periods of time, and greater dosages for shorter periods of time to obtain essentially equivalent results.

The benefits of transglucosidase removal will be most readily apparent if the substrate concentration is greater than about 5 grams per 100 ml. The more concentrated the substrate, the greater the beneficial effect of transglucosidase removal.

The amount of clay mineral used in the treatment of the enzyme preparation will depend to a certain extent upon the species of clay mineral used, the amount of enzyme activity present, the amount of extraneous material present, and the pH value during treatment. In general, a pH value of about 4 will be most suitable for treatment.

The time of treatment is not critical, as long as the clay is well dispersed in the enzyme preparation.

The effects of the clay mineral treatment are the result of the greater adsorptive capacity for transglucosidase activity than for glucamylase activity. While it may be desirable to use somewhat more than the minimum amount necessary to effect substantially complete removal of transglucosidase, in order to insure maximum conversion of the substrate to dextrose with the treated enzyme preparation; in no case has it been found necessary or desirable to use more than the amount which will adsorb more than 20 percent of the glucamylase activity.

The adsorptive preference of clay minerals is sufficiently selective for transglucosidase so that transglucosidase removal will be essentially complete at a clay concentration which will adsorb less than 20 percent of the glucamylase activity. In most cases, transglucosidase activity can be completely adsorbed with a loss of glucamylase activity not greater than 10 to 15 percent, even a loss of 20 percent of the glucamylase activity is not a substantial loss in view of the considerable improvement obtained, particularly since it is true that eleven units of a clay-treated preparation per 100 grams of starch will give hydrolyzates of higher dextrose contents than will fourteen units of the untreated preparation.

It will be noted from the foregoing description and the examples which follow that we have made a decided improvement in the art by a simple, inexpensive, yet highly effective expedient.

The invention may be further illustrated by the examples which follow. They are for illustrative purposes only and are not to be construed as limiting our invention.

EXAMPLE I

A series of enzyme preparations containing various ratios of transglucosidase: glucamylase activity was prepared by ammonium sulfate fractionation, by solvent fractionation, and by clay mineral treatment. These enzyme preparations, derived from cultures of the *Aspergillus niger* group, were used to convert a partial hydrolyzate of starch as follows: A 35 percent by weight suspension of corn starch was acid hydrolyzed to a dextrose equivalent (D.E. value) of 16 (dextrose equivalent refers to the reducing sugar content of the hydrolyzate, calculated as dextrose, and expressed as percent by weight of the dry substance present). The thinned starch was adjusted to pH 4.5, brought to 60° C., and an amount of enzyme preparation was added calculated to contain 14 units of glucamylase activity per 100 grams of thinned starch dry substance. After 72 hours of incubation at 60° C., the liquors were analyzed for D.E. and dextrose content, with the results shown in Table I. The relation between the transglucosidase:glucamylase ratio and the extent of conversion is well established.

*Table I*

| Ratio, Transglucosidase: Glucamylase | Composition of Enzyme Converted Liquor | |
|---|---|---|
| | D.E. | Dextrose, percent D.B. |
| 0.252 | 90.1 | 83.5 |
| 0.178 | 91.1 | 85.6 |
| 0.166 | 91.2 | 85.6 |
| 0.166 | 90.7 | 85.6 |
| 0.157 | 90.9 | 85.8 |
| 0.155 | 91.6 | 86.6 |
| 0.154 | 92.1 | 88.1 |
| 0.147 | 92.2 | 87.7 |
| 0.142 | 92.2 | 87.6 |
| 0.132 | 92.7 | 88.7 |
| 0.125 | 92.6 | 88.5 |
| 0.100 | 92.8 | 88.8 |
| 0.100 | 93.6 | 89.8 |
| 0.091 | 94.1 | 90.9 |
| 0.086 | 93.7 | 90.3 |
| 0.045 | 95.1 | 92.8 |
| 0.043 | 94.7 | 92.5 |
| 0.042 | 95.0 | 92.8 |
| 0.042 | 95.4 | 93.2 |

EXAMPLE II

Clay minerals as a group are effective in the selective removal of transglucosidase activity without removal of appreciable quantities of glucamylase activity. A culture of *Aspergillus niger* Corn Products Company Culture No. M–370, isolated from a soil sample from Louisiana, was grown in a fermentor under submerged, aerobic conditions on a medium composed of 14 percent ground corn and 1.0 percent corn steep liquor dry substance. After completion of the fermentation, the liquor was filtered to remove the mycelium and other suspended matter. The filtrate was divided into several parts.

To 100-ml. portions of the culture filtrate at pH 4.0 was added, with agitation, 5 grams of finely divided clay mineral. After 30 minutes agitation, the clay mineral was separated by filtration. The resulting filtrates were examined for glucamylase activity, for alpha-amylase activity, and for transglucosidase activity. There was no appreciable decrease in alpha-amylase activity. The treated filtrates, along with the untreated control, were used to convert a 16 D.E. hydrolyzate of corn starch as described in Example I. In this example, the amount of clay used was 2.4 grams per 100 units of glucamylase activity. The results shown in Table II demonstate the applicability of clay minerals as a group to the removal of transglucosidase, and the effectiveness of transglucosidase removal by clay minerals in increasing the dextrose yield attainable by the enzyme preparation.

EXAMPLE III

While it may be desirable to first remove any insoluble material present in the enzyme preparation prior to treatment with a clay mineral, it is not essential to do so. A culture of *Aspergillus niger* M-370 was grown in a fermentor as described in Example II. After completion of the fermentation, the whole culture liquor was removed from the fermentor and divided into four 100-ml. portions. The first part was not treated in any way. The second part was agitated at pH 4.0 with 2.0 grams of clay mineral, sold under the trademark "Volclay Bentonite." The mixture containing the mold mycelium and clay mineral was filtered and the filter cake was discarded. The third part was filtered without clay treatment. The fourth part was filtered; the filtrate was agitated with 2.0 grams of "Volclay Bentonite" added.

the filtrates from clay mineral treatment as described in Example I. The amount of clay required for effective removal of transglucosidase, as shown in Table III, will depend to a certain extent upon the species of clay mineral used.

Table III

| Amount of Clay Mineral Used | | Clay Mineral Trademark | | | |
|---|---|---|---|---|---|
| Grams per 100 ml. of enzyme preparation | Grams per 100 glucamylase units | Volclay Bentonite | Attapulgus Clay | Florex XXF | Panther Creek |
| | | Dextrose Content of Enzyme-Converted Liquor, Percent Dry Basis | | | |
| 0 | 0 | 86.5 | 86.5 | 86.5 | 86.5 |
| 0.2 | 0.10 | 88.5 | | | |
| 0.5 | 0.24 | 93.0 | | | 86.9 |
| 1.0 | 0.49 | 93.1 | 92.1 | 91.6 | 89.1 |
| 2.0 | 0.96 | 93.3 | 92.0 | 93.6 | 93.6 |
| 5.0 | 2.40 | 94.0 | 93.3 | 93.0 | 93.3 |

Table II

| Clay Mineral Trademark | Major Mineral Component | Type | Treatment of Clay | Glucamylase Content of Filtrate, Units per ml. | Transglucosidase Glucamylase Ratio | Dextrose Content of Enzyme-Converted Hydrolyzate, percent dry basis |
|---|---|---|---|---|---|---|
| Untreated Control | | | | 2.08 | 0.16 | 86.4 |
| Volclay Bentonite | Montmorillonite. | Swelling Bentonite. | None | 2.04 | 0.05 | 93.0 |
| Panther Creek | do | Nonswelling Bentonite. | None | 2.01 | 0.05 | 93.3 |
| Adsorbol A-565 | do | | Calcined | 2.04 | 0.05 | 93.0 |
| Adsorbol A-46 | do | | Impregnated. | 1.89 | 0.03 | 94.2 |
| Filtrol 105 | do | Sub-Bentonite. | Acid Activated. | 2.04 | 0.06 | 92.1 |
| Pikes Peak 9S77 | do | Fuller's Earth. | None | 1.91 | 0.03 | 93.1 |
| Pikes Peak 9T77 | do | do | Calcined | 1.93 | 0.07 | 91.8 |
| Florex XXF | Floridin | do | None | 1.96 | 0.05 | 93.0 |
| Calcined Florex XXF | do | do | Calcined | 1.89 | 0.05 | 93.3 |
| Attapulgus Clay | Attapulgite | Fuller's Earth. | None | 1.91 | 0.05 | 93.8 |
| Bandy Tan | Kaolinite | Ball Clay | | 1.97 | 0.05 | 93.1 |
| Illinois Fire Clay | do | | | 1.98 | 0.13 | 88.7 |
| Grundite | Illite | | | 1.92 | 0.07 | 92.0 |

The suspension was then filtered. Conversion of a 16 D.E. thinned starch was, as described under Example I, carried out with the four preparations. This example shows that whole culture liquor may be effectively treated with a clay mineral.

| Filtration of Culture Liquor | Clay Mineral Treatment | Glucamylase Activity, Units per ml. | Dextrose Content of Enzyme-Converted Liquor, Percent dry basis |
|---|---|---|---|
| Unfiltered | None | 2.30 | 84.7 |
| | 2% | 2.24 | 92.3 |
| Filtered | None | 2.30 | 86.1 |
| | 2% | 2.33 | 92.8 |

EXAMPLE IV

While clay minerals as a group are effective in the removal of transglucosidase from fungal enzyme preparations, they are not all equally effective at a given amount. In an *Aspergillus niger* culture liquor filtrate containing about 2 units of glucamylase activity per ml., for example, it will be found that where 0.5 gram of Volclay Bentonite will accomplish effective removal of transglucosidase, as much as 5 grams or more of other clay minerals will be required to accomplish the same extent of removal.

Portions of a culture filtrate of *Aspergillus niger* M-370 were treated at pH 4.0 with various amounts of several clay minerals as described in Example II. Conversion of a 16 D.E. hydrolyzate of starch was carried out with

EXAMPLE V

While some transglucosidase can be removed over a considerable range of pH values, it will be found that the treatment is most effective in the pH range of 3 to 5, and a pH value of about 4.0 is recommended. With some enzyme preparations, it may be necessary to make periodic adjustments of the pH value during the treatment period, since the addition of the clay may result in a change of the pH value. At pH values above 6, either transglucosidase removal will be incomplete, or such an excessive amount of clay will be required to obtain substantially complete removal of transglucosidase that a considerable loss of glucamylase and alpha-amylase activity will occur. At pH values below 3, substantial inactivation or adsorption of glucamylase may occur.

Separate portions of a culture filtrate from a submerged culture of *Aspergillus niger* were adjusted with hydrochloric acid or with sodium hydroxide to the pH values shown below. To each 100 ml. portion was added 2.0 grams of Volclay Bentonite. The mixtures were agitated for 30 minutes and filtered. Results of conversions conducted with the treated enzyme preparations, carried out as described in Example I, are shown below.

| pH value prior to addition of clay | 2.0 | 2.4 | 3.0 | 4.0 | 4.3 | 5.0 |
|---|---|---|---|---|---|---|
| pH value of filtrate after treatment | 2.2 | 2.5 | 3.1 | 4.0 | 4.6 | 5.2 |
| Glucamylase Activity of filtrate, percent of original | 26.6 | 42.8 | 75.5 | 100 | 96.0 | 93.0 |
| Dextrose content of Enzyme Converted Liquor, percent D.B. | 91.9 | 92.7 | 93.2 | 93.0 | 92.1 | 87.9 |

The initial glucamylase content of the culture filtrate was 2.33 units per ml. The dextrose content of hydrolyzate obtained with the untreated preparation was 85.9%, dry basis.

EXAMPLE VI

Another sample of *Aspergillus niger* M-370 culture filtrate, with a glucamylase activity of 2.20 units per ml., was treated essentially as described in Example V, but with various amounts of Volclay Bentonite.

| Amount of Clay Mineral Used: | | | | | |
|---|---|---|---|---|---|
| g./100 ml | 0 | 0.5 | 1 | 2 | 5 |
| g./100 units | 0 | 0.23 | 0.45 | 0.91 | 2.3 |
| GLUCAMYLASE ACTIVITY OF FILTRATE, PERCENT OF ORIGINAL | | | | | |
| pH value during treatment: | | | | | |
| 3 | 100 | 98.2 | 98.2 | 98.2 | 97.9 |
| 4 | 100 | 100 | 100 | 100 | 100 |
| 5 | 100 | 100 | 100 | 100 | 100 |
| 6 | 100 | 98.2 | 97.8 | 98.2 | 99.0 |
| DEXTROSE CONTENT OF ENZYME-CONVERTED LIQUOR, PERCENT D.B. | | | | | |
| 3 | 85.0 | 85.8 | 91.3 | 92.5 | 92.5 |
| 4 | 85.0 | 88.7 | 91.8 | 92.5 | 92.5 |
| 5 | 85.0 | 85.5 | 88.2 | 90.8 | 92.1 |
| 6 | 85.0 | 84.8 | 84.6 | 85.5 | 88.7 |

EXAMPLE VII

The cultures described as *Aspergillus niger* NRRL 330 and NRRL 337 have been studied very exhaustively for production of amylases (Tsuchiya et al., Cereal Chem. 27, 322 (1950)). These and other members of the *Aspergillus niger* group (see Thom and Raper, "A Manual of the Aspergilli," Williams and Wilkins Co. (1945)) were grown on a corn and corn steep liquor medium as described in Example II. The culture filtrates therefrom were divided into two portions. One portion was untreated, the other portion was treated with Volclay Bentonite at pH 4.0 for 30 minutes, then filtered. The untreated culture filtrates and the clay-treated filtrates were then added to a 20% solution of a 16 D.E. hydrolyzate of starch, adjusted to pH 4.3, and held at 60° C. for 48 hours. The enzyme dosage used was in each case 28 glucamylase units per 100 grams of starch dry substance. The enzyme-converted hydrolyzates were analyzed for dextrose content with the results shown below: In all cases, the hydrolyzate from the clay treated enzyme preparation had a substantially higher dextrose content than that obtained with the untreated preparation, showing the general applicability of transglucosidase removal through clay-mineral treatment to members of the *Aspergillus niger* group.

| Culture | Dextrose Content of Enzyme-Converted Hydrolyzate, Percent D.B. | |
|---|---|---|
| | Untreated Preparation | Clay treated Preparation |
| *Aspergillus awamori* NRRL 2042 | 85.0 | 89.7 |
| *Aspergillus fonsecaeus* NRRL 67 | 90.4 | 92.8 |
| *Aspergillus niger* CPC M-370 | 86.0 | 92.8 |
| *Aspergillus niger* NRRL 330 | 86.0 | 92.8 |
| *Aspergillus niger* NRRL 3 | 86.7 | 92.1 |
| *Aspergillus niger* NRRL 337 | 87.0 | 92.5 |
| *Aspergillus niger* NRRL 363 | 89.7 | 95.1 |
| *Aspergillus niger* mut *cinnamomeus* NRRL 348 | 86.0 | 90.8 |
| *Aspergillus niger* mut *Schiemanii* NRRL 361 | 84.3 | 90.4 |
| *Aspergillus phoenicis* CPC M-381 | 88.8 | 91.5 |
| *Aspergillus phoenicis* NRRL 1956 | 84.0 | 93.1 |
| *Aspergillus phoenicis* ATCC 13156 | 86.0 | 90.4 |

EXAMPLE VIII

Enzyme preparations derived from the *Aspergillus flavus-oryzae* group are also known to convert amylaceous materials to substantial amounts of dextrose. Several dried preparations derived from *Aspergillus flavus-oryzae* group were dissolved or suspended in water, treated with Volclay Bentonite at pH 4.0 for 30 minutes, and filtered. The filtrates, as well as the untreated preparations, were used to convert a 16 D.E. hydrolyzate of starch as described in Example I, except that the conversions were carried out at pH 4.6–4.8, 50° C., for 72 hours, using an amount of enzyme preparation equivalent to 14 glucamylase units per 100 grams of starch dry substance. Activity determinations were also carried out at pH 4.6–4.8, and 50° C.

| Enzyme Preparation | Rhozymes | Dextrinase | Mylase |
|---|---|---|---|
| Glucamylase Activity of solution, Units/ml: | | | |
| Before Clay Treatment | 0.46 | 0.45 | 0.44 |
| After Clay Treatment | 0.46 | 0.44 | 0.43 |
| Amount of Clay used: | | | |
| g/100 ml | 5 | 5 | 5 |
| g/100 units | 10.8 | 11.1 | 11.3 |
| Dextrose Content of enzyme-converted liquor: | | | |
| Untreated preparation | 86.6 | 87.7 | 91.5 |
| Clay-treated preparation | 92.1 | 91.3 | 92.8 |

EXAMPLE IX

A dried enzyme preparation derived from a culture of *Rhizopus delemar* was dissolved in water. One portion of the solution was not treated, the other was treated at pH 4.0 with 2 grams of Volclay Bentonite per 100 ml. of solution. Conversions of 16 D.E. thinned starch were conducted as described in Example VII. Dextrose contents of hydrolyzates resulting from conversion with the untreated and clay treated preparations were 85.1 and 93.3, respectively.

EXAMPLE X

In the case of substantially purified enzyme preparations, the pH range over which transglucosidase can be effectively removed is extended up to at least pH 6. However, it will also be found that at a given glucamylase concentration, less clay will be required to effect substantially complete removal of transglucosidase. Also, clay concentrations at which substantially complete removal of transglucosidase from an unpurified preparation is attained without substantial loss of glucamylase activity may cause inactivation or adsorption of glucamylase in the purified preparation.

An enzyme preparation derived from *Aspergillus niger* M-370 was purified by solvent precipitation. The purified preparation contained essentially all of the glucamylase, alpha-amylase, and transglucosidase activity of the original preparation, but only 5 percent of the total solids. The purified preparation was dissolved in water to give a glucamylase concentration of 1.76 units per ml. Portions of the solution were treated at pH 3, 4, 5, or 6 for 30 minutes with various amounts of Calcined Florex XXF, with the results shown below.

| Amount of Clay Mineral used: | | | | | | | |
|---|---|---|---|---|---|---|---|
| g/100 ml | 0 | 0.05 | 0.10 | 0.5 | 1.0 | 2.0 | 5.0 |
| g/100 units | 0 | 0.028 | 0.057 | 0.28 | 0.57 | 1.14 | 2.8 |
| ph value during treatment: | GLUCAMYLASE ACTIVITY OF FILTRATE, PERCENT OF ORIGINAL | | | | | | |
| 3 | 100 | 98.3 | 95.5 | 89.3 | | 75.5 | |
| 4 | 100 | 100 | 99.0 | 93.2 | 92.5 | | 78.3 |
| 5 | 100 | 100 | 100 | 100 | 96.0 | | 84.5 |
| 6 | 100 | | | 100 | 97.1 | 94.4 | 85.4 |
| | DEXTROSE CONTENT OF ENZYME-CONVERTED LIQUOR, PERCENT D.B. | | | | | | |
| 3 | 86.7 | 86.0 | 88.0 | 92.3 | | 93.3 | |
| 4 | 86.0 | 87.2 | 86.3 | 91.8 | 93.0 | | 93.3 |
| 5 | 85.6 | 86.0 | 85.5 | 88.0 | 90.6 | | 93.3 |
| 6 | 85.6 | | 85.5 | 85.5 | | 89.9 | 92.6 |

EXAMPLE XI

A culture filtrate of *Aspergillus niger* M-370, and a purified preparation like the one described in Example X were each treated at a glucamylase concentration of 1.66 units per ml. with, at pH 4.0, various amounts of Volclay Bentonite.

| Amount of Volclay Bentonite Used | | Results with Unpurified Enzyme | | Results with Purified Enzyme | |
|---|---|---|---|---|---|
| g./100 ml. | g./100 units | Loss of Glucamylase Activity, Percent | Dextrose Content of Enzyme-Converted Liquor, Percent D.B. | Loss of Glucamylase Activity, Percent | Dextrose Content of Enzyme-Converted Liquor, Percent D.B. |
| 0 | 0 | 0 | 85.0 | 0 | 86.0 |
| 0.025 | 0.015 | | | 0 | 87.0 |
| 0.05 | 0.03 | | | 1.8 | 88.4 |
| 0.1 | 0.06 | 0 | 86.0 | 4.2 | 93.0 |
| 0.25 | 0.15 | 0 | 87.0 | 6.0 | 93.3 |
| 0.5 | 0.3 | 0 | 88.7 | 10.8 | 93.3 |
| 1.0 | 0.6 | 0 | 92.1 | 27.7 | 93.3 |
| 2.0 | 1.2 | 0 | 92.5 | | |
| 5.0 | 2.4 | 1 | 92.5 | | |
| 10.0 | 4.8 | 2 | 92.7 | | |

EXAMPLE XII

In the case of dilute enzyme preparations, it may be necessary to use a lesser amount of clay to remove transglucosidase selectively. For example, *Aspergillus niger* M-370 culture filtrate was diluted to glucamylase concentrations of 1.7, and 0.1 units of glucamylase per ml. Each portion was then treated with various amounts of Volclay Bentonite at pH 4.0. For simplicity of expression, the following values were read from plots of the data. Values in parenthesis were obtained by extrapolation because of the difficulty of dispersing these amounts of Volclay Bentonite in the volume shown.

The amount of alpha-amylase adsorption was nearly the same value as shown for glucamylase adsorption. Similar results were obtained with the clay minerals Florex XXF and Adsorbol A-420.

| Amount of Volclay Used, g./100 units glucamylase | Initial Glucamylase Concentration, Units/ml. | | | | | |
|---|---|---|---|---|---|---|
| | 0.1 | | | 1.7 | | |
| | Clay concentration, g./100 ml. | Transglucosidase removed, percent | Glucamylase loss, percent | Clay concentration, g./100 ml. | Transglucosidase removed, percent | Glucamylase loss, percent |
| 0.1 | 0.01 | 10 | 1 | 0.17 | 11 | 0 |
| 0.25 | 0.025 | 30 | 2 | 0.42 | 39 | 0 |
| 0.5 | 0.05 | 66 | 3 | 0.85 | 100 | 0 |
| 1.0 | 0.1 | 100 | 5 | 1.7 | | 0 |
| 2.5 | 0.25 | | 9 | 4.2 | | 1 |
| 5 | 0.5 | | 13 | 8.5 | | 2 |
| 10 | 1.0 | | 19 | (17) | | (4) |
| 25 | 2.5 | | 31 | (42) | | (10) |
| 50 | 5.0 | | 46 | (85) | | (19) |
| 100 | 10 | | 67 | (170) | | (37) |

EXAMPLE XIII

The benefits of transglucosidase removal from fungal amylase preparations may be attained on substrates ranging from gelatinized starch to starch which has previously been subjected to appreciable acid or enzyme conversion. An 18% d.s. suspension of corn starch was first gelatinized and then cooked at 121° C. for one hour. One portion of the cooked starch was converted for 90 hours at pH 4.5 with an *Aspergillus niger* M-370 enzyme preparation which had not been treated with a clay mineral. Another portion was converted in the same manner with a preparation which had been treated with Volclay Bentonite. In each case, the enzyme dosage was 20 glucamylase units per 100 grams of starch. The filtered hydrolyzates in conversions with the untreated and treated enzyme preparations contained, on a dry basis, 93.3 and 98.0% dextrose, respectively.

This application is a continuation-in-part of application Serial No. 666,469, filed June 18, 1957, and now abandoned.

We claim:

1. A process for selective removal of transglucosidase activity from a fungal amylase preparation obtained from an organism selected from the group consisting of members of the Aspergillus genus and members of the Rhizopus genus, said preparation containing transglucosidase and glucamylase activities, which comprises treating said amylase preparation in aqueous medium with a clay mineral in an amount up to 50 grams of clay mineral per 100 units of glucamylase activity and not greater than that which will remove 46 percent of the glucamylase activity to adsorb the transglucosidase on the clay mineral, separating the medium from the clay mineral, and recovering said medium substantially free from transglucosidase activity, said recovered medium containing at least 54 percent of the glucamylase activity of the original preparation.

2. A process for hydrolyzing starch to dextrose which comprises partially hydrolyzing the starch to reduce the viscosity thereof and thereafter subjecting it to the action of a fungal amylase preparation treated by the process of claim 1.

References Cited in the file of this patent

Cereal Chemistry, vol. 26, No. 2, March 1949, pp. 98–109.